United States Patent
Abdullah-Alaqel et al.

(10) Patent No.: US 10,788,021 B1
(45) Date of Patent: Sep. 29, 2020

(54) PARTICLE-TO-WORKING FLUID HEAT EXCHANGER AND SOLAR POWER GENERATOR USING THE SAME

(71) Applicant: KING SAUD UNIVERSITY, Riyadh (SA)

(72) Inventors: Shaker Saeed Abdullah-Alaqel, Riyadh (SA); Nader Shaif Esmail Saleh, Riyadh (SA); Rageh Saadallah Ali Saeed, Riyadh (SA); Eldwin Djajadiwinata, Riyadh (SA); Abdulelah Ibrahim Abdulaziz Alswaiyd, Riyadh (SA); Hany Abdulrahman Al-Ansary, Riyadh (SA); Sheldon Moseley Jeter, Atlanta, GA (US); Abdelrahman Mahmoud Elleathy, Riyadh (SA); Obida Mohamed Zeitoun, Riyadh (SA); Zeyad Abdurhman Alsuhaibani, Riyadh (SA); Syed Noman Danish, Riyadh (SA); Said Ibrahim Abdel-Khalik, Atlanta, GA (US); Saeed Mohammed Al-Zahrani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/833,096

(22) Filed: Mar. 27, 2020

(51) Int. Cl.
*F03G 6/06* (2006.01)
*F03G 6/00* (2006.01)
(Continued)

(52) U.S. Cl.
CPC .............. *F03G 6/003* (2013.01); *F03G 6/06* (2013.01); *F24S 10/00* (2018.05); *F24S 20/30* (2018.05); *F24S 70/60* (2018.05)

(58) Field of Classification Search
CPC ..... F03G 6/00; F28G 1/12; F28G 1/00; F28D 7/00; C21B 13/0026; C21B 2100/66
See application file for complete search history.

(56) References Cited

U.S. PATENT DOCUMENTS

| 4,727,930 A | 3/1988 | Bruckner et al. |
| 2011/0209475 A1* | 9/2011 | Jeter ....................... F24S 20/20 60/641.11 |

(Continued)

FOREIGN PATENT DOCUMENTS

| CN | 105526808 A | 4/2016 |
| CN | 105987637 A | 10/2016 |

(Continued)

*Primary Examiner* — Shafiq Mian
(74) *Attorney, Agent, or Firm* — Nath, Goldberg & Meyer; Richard C. Litman

(57) ABSTRACT

The particle-to-working fluid heat exchanger is a particle-to-working fluid counter-flow direct contact heat exchanger formed from a heat exchange chamber having opposed upper and lower ends. A diameter of the heat exchange chamber decreases from the upper end to the lower end, with a fluid inlet positioned adjacent the lower end for receiving a stream of fluid. The stream of fluid is tangentially and upwardly directed within the heat exchange chamber. The heat exchange chamber also has a fluid outlet positioned adjacent the upper end thereof. A distribution manifold for the heat exchange chamber produces a plurality of streams of heated particles which exchange thermal energy with the stream of fluid to generate a stream of heated fluid and a volume of cooled particles. A solar power generator, in the form of a solar tower, is further provided, which incorporates the particle-to-working fluid counter-flow direct contact heat exchanger.

12 Claims, 4 Drawing Sheets

(51) Int. Cl.
*F24S 10/00* (2018.01)
*F24S 70/60* (2018.01)
*F24S 20/30* (2018.01)

(56) References Cited

U.S. PATENT DOCUMENTS

| | | | | |
|---|---|---|---|---|
| 2015/0316328 | A1* | 11/2015 | Trainham | F03G 6/00 165/10 |
| 2015/0345480 | A1* | 12/2015 | Bandhauer | F24S 60/00 60/641.8 |
| 2018/0036804 | A1* | 2/2018 | Reid | C21B 13/0086 |
| 2020/0048724 | A1* | 2/2020 | Green | C21B 13/0073 |

FOREIGN PATENT DOCUMENTS

| | | |
|---|---|---|
| CN | 107100807 A | 8/2017 |
| KR | 20120020810 A | 3/2012 |

\* cited by examiner

PARTICLE-TO-WORKING FLUID HEAT EXCHANGER AND SOLAR POWER GENERATOR USING THE SAME

BACKGROUND

1. Field

The disclosure of the present patent application relates to heat exchangers, and particularly to a particle-to-working fluid counter-flow direct contact heat exchanger, as well as a solar power generator using the particle-to-working fluid counter-flow direct contact heat exchanger.

2. Description of the Related Art

Typical "falling cloud" heat exchangers make use of solid particles, which are dropped down a tube and fall against up-flowing atmospheric air, which is fed through the bottom of the tube. Although a variety of design variants have been attempted, such as the addition of various pressurized tanks and the like, such heat exchangers are typically impractical and serve primarily as "proof of concept" models. In particular, realistic design considerations have not yet been considered to overcome numerous drawbacks of such heat exchangers. For example, such typical falling cloud heat exchangers fail to take into consideration the problem of the particles being carried upwardly by the up-flowing air when the velocity of the air increases beyond the terminal velocity of the particles. In practice, up-flowing particles can cause severe damage to downstream components, such as a turbine, which are designed to only receive air.

Further, such typical heat exchangers typically include relatively basic inlets for the particles, resulting in highly uneven and unequal particle distribution, thus requiring impractically long residence time (or a longer falling path) for heat exchange between the particles and the fluid. Additionally, such typical heat exchangers have largely been focused on the heat exchange itself, rather than on optimizing fluid flow. As a result, large eddies, large scale turbulence and other undesirable conditions exist within the heat exchange chambers. A related problem is the positioning of the fluid outlet near the distribution point of the particles, thus causing a disruption of the particle distribution due to the abrupt pressure drop at the point where the fluid has its greatest velocity. Thus, a particle-to-working fluid heat exchanger and a solar power generator using the same solving the aforementioned problems are desired.

SUMMARY

The particle-to-working fluid heat exchanger is a particle-to-working fluid counter-flow direct contact heat exchanger formed from a heat exchange chamber having opposed upper and lower ends. A diameter of the heat exchange chamber decreases froth the upper end to the lower end, with a fluid inlet positioned adjacent the lower end for receiving a stream of fluid. The stream of fluid is tangentially and upwardly directed within the heat exchange chamber. The heat exchange chamber also has a fluid outlet positioned adjacent the upper end thereof. A distribution manifold for the heat exchange chamber includes a receiving cup and a plurality of feed tubes. Each of the feed tubes has opposed upper and lower ends, and the plurality of feed tubes pass through the upper end of the heat exchange chamber such that the lower ends of the plurality of feed tubes are located within the heat exchange chamber. The upper ends of the plurality of feed tubes are in communication with the receiving cup, The receiving cup is adapted for receiving a volume of heated particles. Each of the feed tubes is adapted for distributing a stream of the heated particles into the heat exchange chamber. Each stream of heated particles exchanges thermal energy with the stream of fluid to generate a stream of heated fluid and a volume of cooled particles.

In an alternative embodiment, a solar power generator, in the form of a solar tower, incorporates the particle-to-working fluid counter-flow direct contact heat exchanger described above. The solar power generator includes a hopper for receiving a stream of cooled particles and a solar energy receiver in communication with the hopper. A solar concentrator concentrates solar radiation on the solar energy receiver to heat the cooled particles received from the hopper. A heated particle receptacle is in communication with the solar energy receiver for receiving heated particles therefrom. A particle receiver is in communication with the heated particle receiver, with an inlet thereof being adapted for receiving a stream of heated particles from the heated particle receptacle.

Counter-flow direct contact heat exchange takes place in the heat exchange chamber which, as described above, has a tapered contour, such that a diameter of the heat exchange chamber decreases from an upper end thereof to a lower end thereof. As further described above, the heat exchange chamber has a fluid inlet positioned adjacent the lower end thereof for receiving a stream of fluid, and the stream of fluid is tangentially and upwardly directed within the heat exchange chamber (i.e., the positioning of the inlet and the substantially inverted conical shape of the heat exchange Chamber create an upwardly directed cyclonic flow within the heat exchange chamber). A first compressor in fluid communication with the fluid inlet of the heat exchange chamber may be used to produce and deliver the stream of fluid thereto. The heat exchange chamber further has a fluid outlet positioned adjacent the upper end thereof.

As discussed with regard to the previous embodiment, the distribution manifold includes a receiving cup and a plurality of feed tubes. The plurality of feed tubes pass through the upper end of the heat exchange chamber such that lower ends thereof are located within the heat exchange chamber. The upper ends of the plurality of feed tubes are in communication with the receiving cup, which is positioned above, and external to, the heat exchange chamber. The receiving cup is in communication with an outlet of the particle receiver and is adapted for receiving a volume of heated particles therefrom. Each of the feed tubes is adapted for distributing a stream of the heated particles into the heat exchange chamber, such that each stream of heated particles falls under the force of gravity and exchanges thermal energy with the cyclonic stream of fluid (via counter-flow direct contact heat exchange) to generate a stream of heated fluid and the cooled particles. The distribution manifold may include a plurality of balls respectively suspended beneath the lower ends of the plurality of feeds tubes, such that each feed tube terminates in a particle sprinkler, sprinkling each stream of heated particles within the heat exchange chamber. It should be understood that the balls may be replaced by any suitable type of obstructing elements.

Any suitable type of fluid-powered generator may be used to convert the thermal and kinetic energy of the stream of heated fluid into usable electricity. As a non-limiting example, a turbine may be in fluid communication with the fluid outlet of the heat exchange chamber for receiving the stream of heated fluid. In this non-limiting example, a generator may be coupled to the turbine for generating usable electricity.

The heat exchange chamber may have a particle outlet positioned adjacent the lower end thereof for releasing the cooled particles. A particle receptacle may be positioned beneath the heat exchange chamber, in communication with the particle outlet for temporarily collecting the cooled particles. A second compressor may be used to generate a stream of pressurized fluid, such that at least a portion of the stream of pressurized fluid carries the cooled particles from the particle receptacle to the inlet of the particle receiver, thus recirculating the cooled particles.

As discussed above, the heat exchange chamber has a tapered contour, such that a diameter of the heat exchange chamber decreases from an upper end thereof to a lower end thereof. Due to the upward flow of the fluid, the decrease in fluid density requires an increase in fluid velocity. Additionally, as the cool fluid gains energy through heat exchange with the heated particles (i.e., as the fluid increases in temperature), its velocity further increases, thus increasing the flow area of the fluid corresponding to its increase of temperature. The velocity, however, must be kept beneath the terminal velocity of the falling heated particles, otherwise the heated particles will be swept upward by the fluid. Thus, in order to maintain the velocity of the cool fluid as it travels upward, the cross-sectional area increases as the fluid rises, thus increasing the flow area of the fluid corresponding to its increase of temperature. This maintains the velocity of the fluid as it increases in temperature along its upward path. Near the lower ends of feed tubes, the fluid velocity should be minimized, thus the diameter of heat exchange chamber should be at its maximum (maximizing flow area) in this region.

Further, as noted above, the cool fluid follows a tangential, upwardly flowing path; i.e., a cyclonic path. This tangential flow eliminates eddy currents within the flow and also helps to reduce exerted drag by translating the air velocity into three components in which the upward velocity component (i.e., that responsible for air drag) becomes a fraction of the inlet air velocity. Further, the swirling flow near the bottom end of the heat exchange chamber enhances fluid-particle mixing, which allows the fluid to capture more thermal energy form the falling particles before they leave the heat exchange chamber.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
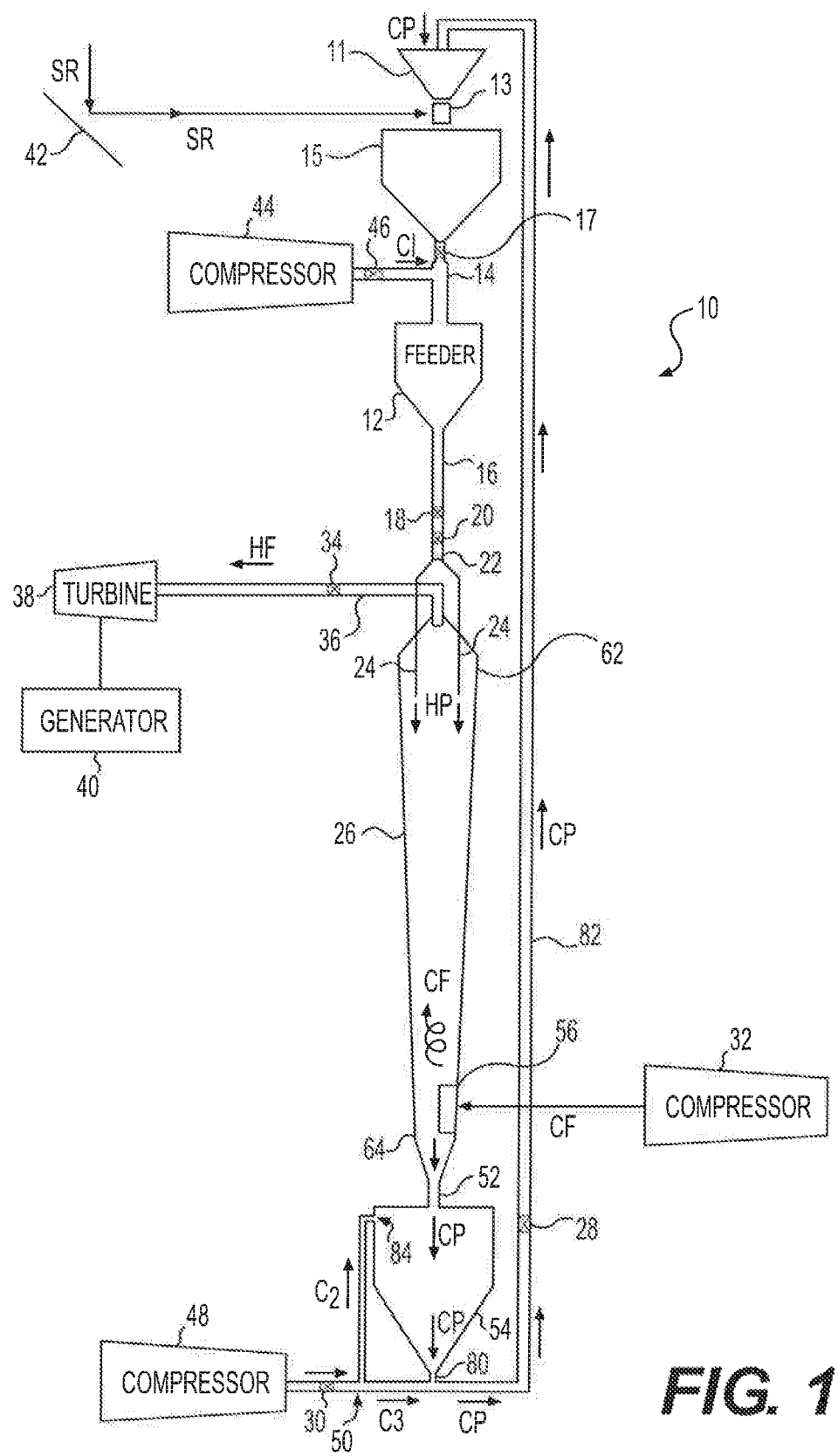
FIG. 1 diagrammatically illustrates a solar power generator which incorporates a particle-to-working fluid heat exchanger.

FIG. 1 illustrates a solar power generator 10, in the form of a solar tower, which makes use of a particle-to-working fluid counter-flow direct contact heat exchanger. The particle-to-working fluid heat exchanger, which includes a heat exchange chamber 26 and a particle distribution manifold 22, will be described in detail below. Returning to FIG. 1, the solar power generator 10 includes a hopper 11 for receiving a stream of cooled particles CP and a solar energy receiver 13 in communication with the hopper. A solar concentrator 42 concentrates solar radiation SR on the solar energy receiver 13 to heat the cooled particles CP received from the hopper 11, it should be understood that solar concentrator 42 is shown diagrammatically in FIG. 1 for purposes of clarity and illustration, and that, in practice, solar concentrator 42 may be any suitable type of solar concentrator used in solar towers, solar generators and the like. Non-limiting examples of solar concentrators include mirror arrays, arrays of Fresnel reflectors and the like. It should be further understood that any suitable type of particles, such as steel, alumina, ceramic, plastic or the like may be used.

A heated particle receptacle 15 is in communication with the solar energy receiver 13 for receiving heated particles HP therefrom. A particle receiver 12 is in communication with the heated particle receiver 15, with an inlet 14 thereof being adapted for receiving a stream of heated particles RP from the heated particle receptacle 15. As shown, inlet 14 may include an isolation valve 17 for controllably closing and isolating particle receiver 12 from heated particle receptacle 15, thus allowing particle receiver 12 to be pressurized. Counter-flow direct contact heat exchange takes place in the heat exchange chamber 26, which has a tapered contour, as shown, such that a diameter of the heat exchange chamber 26 decreases from an upper end 62 thereof to a lower end 64 thereof, as best seen in FIGS. 1 and 2.

The heat exchange chamber 26 has a fluid inlet 56 positioned adjacent the lower end 64 for receiving a stream of cool fluid CF, and the stream of cool fluid CIF is tangentially and upwardly directed within the heat exchange chamber 26 (i.e., the positioning of the inlet 56 and the substantially inverted conical shape of the heat exchange chamber 26 create an upwardly directed cyclonic flow within heat exchange chamber 26). It should be noted that the cyclonic behavior does not extend along the entirety of heat exchange chamber 26, since the cyclonic pattern negatively affects the heat exchange process by directing the up-flowing fluid towards the inner wall of chamber 26, thus keeping the core 26 starved of fluid.

A first compressor 32 in fluid communication with the fluid inlet 56 of the heat exchange chamber 26 may be used to produce and deliver the stream of cooled fluid CF thereto. It should be understood that first compressor 32 may be any suitable type of fluid compressor or, alternatively, may be any suitable source of pressurized fluid. The heat exchange chamber 26 further has a fluid outlet 36 positioned adjacent upper end 62. It should be understood that cool fluid CF may be any suitable type of fluid, such as compressed air or the like.

Figure 2:
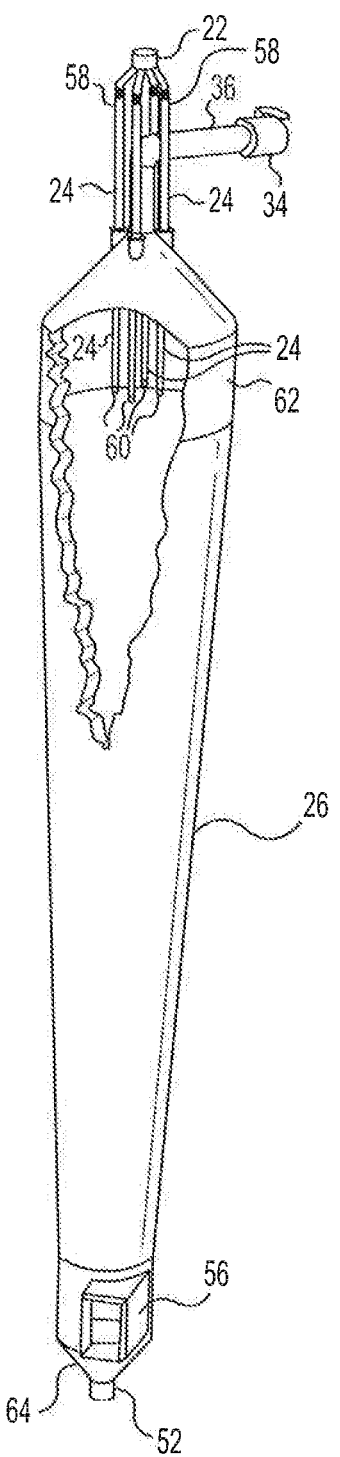
FIG. 2 is a partially cut-away perspective view of a heat exchange chamber and distribution manifold of the particle-to-working fluid heat exchanger.
Figure 3:
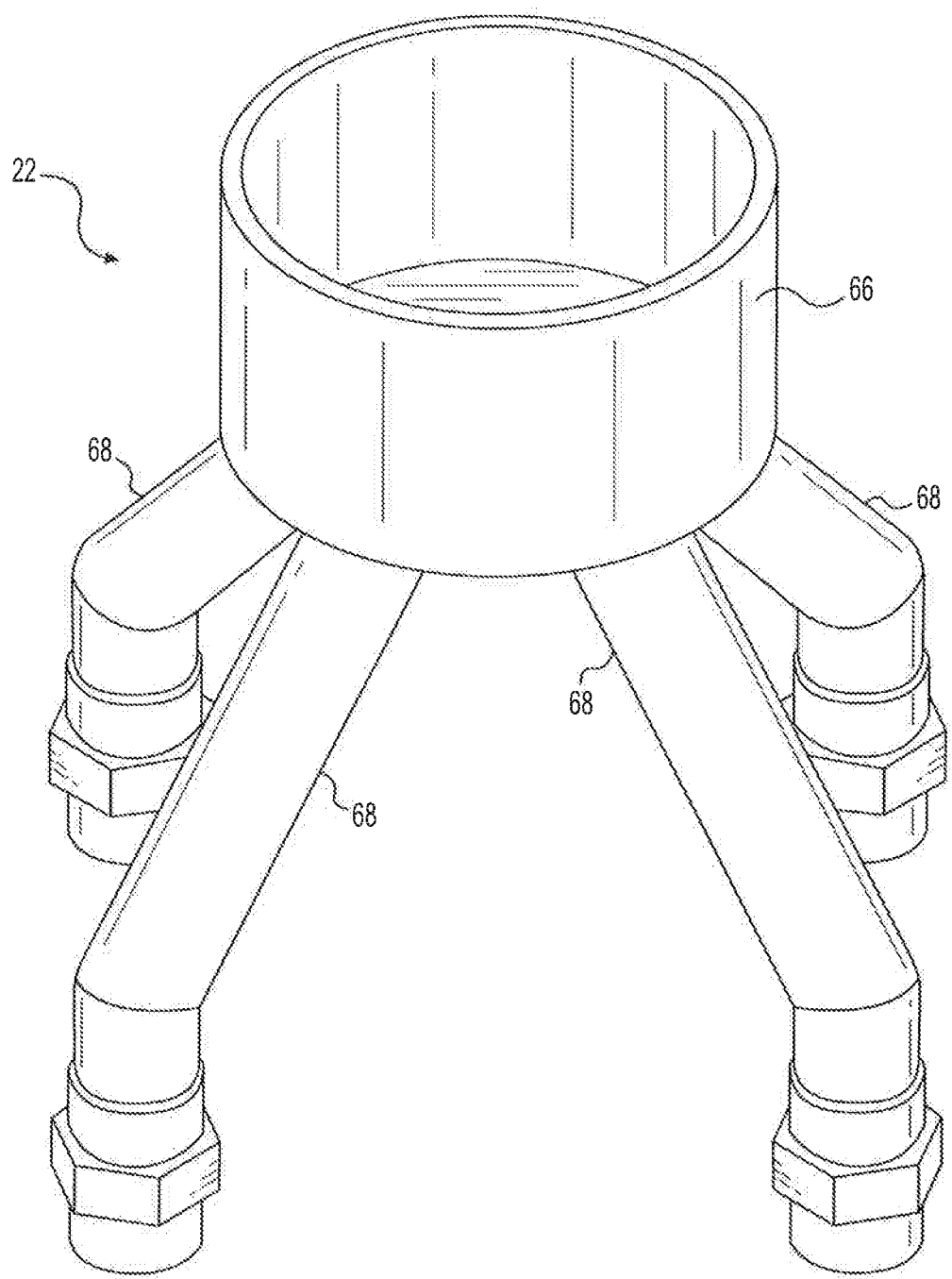
FIG. 3 is a partial perspective view of the distribution manifold of the particle-to-working fluid heat exchanger.

As best shown in FIGS. 2 and 3, the distribution manifold 22 includes a receiving cup 66, a plurality of distribution tubes 68, and a plurality of feed tubes 24. The plurality of feed tubes 24 pass through the upper end 62 of the heat exchange chamber 26 such that lower ends 60 thereof are located inside the heat exchange chamber 26. The upper ends 58 of the plurality of feed tubes 24 are respectively connected to the plurality of distribution tubes 68, Which are in communication with the receiving cup 66. The receiving cup 66 is positioned above, and external to, the heat exchange chamber 26, as shown in FIGS. 1 and 2. The receiving cup 66 is in communication with an outlet 16 of the particle receiver 12 and is adapted for receiving a volume of heated particles HP therefrom. As shown in FIG. 1, one or more valves 18, 20 may be used to control the flow of heated particles HP to the distribution manifold 22.

Figure 4:
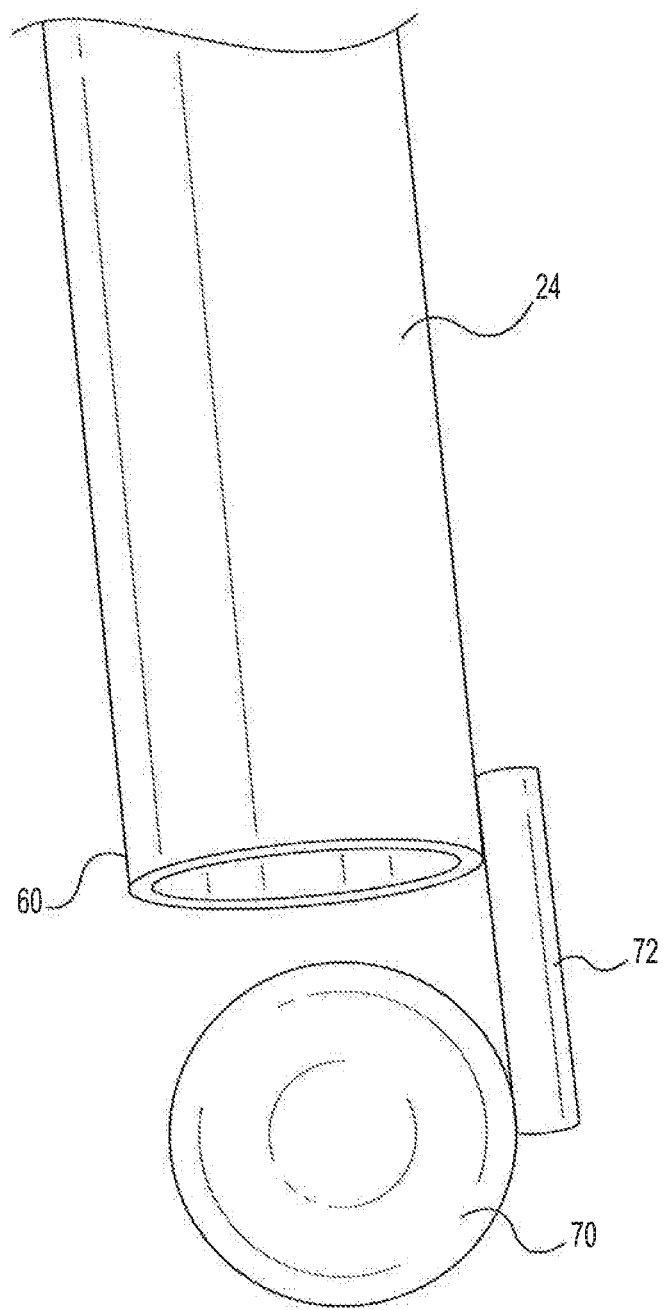
FIG. 4 is a perspective view of a lower end of a feed tube of the distribution manifold.

Each of the feed tubes 24 is adapted for distributing a stream of the heated particles HP into the heat exchange chamber 26, such that each stream of heated particles HP falls under the force of gravity and exchanges thermal energy with the cyclonic stream of cool fluid CF (via counter-flow direct contact heat exchange) to generate a stream of heated fluid HF and the cooled particles CP. The counter-flow configuration ensures the smallest possible temperature difference between the particles and the fluid. Multiple feed tubes 24 are used to maximize uniform distribution of the heated particles HP within the heat exchange chamber 26. Additionally, as shown in FIG. 4, the distribution manifold 22 may include a plurality of balls 70 respectively suspended beneath the lower ends 60 of the plurality of feeds tubes 24 (by respective rods or struts 72, for example), such that each feed tube 24 terminates in a particle sprinkler, sprinkling each stream of heated particles HP within the heat exchange chamber 26, thus further ensuring equal distribution of the heated particles HP within heat exchange chamber 26. It should be understood that the balls 70 may be replaced by any suitable type of obstructing elements.

As discussed above, heat exchange chamber 26 has a tapered contour, such that a diameter of the heat exchange chamber 26 decreases from an upper end 62 thereof to a lower end 64 thereof, as shown in FIGS. 1 and 2. As the cool fluid CF gains energy through heat exchange with the heated particles HP (i.e., as the fluid increases in temperature), its velocity increases, thus increasing the flow area of the fluid corresponding to its increase of temperature. The velocity, however, must be kept beneath the terminal velocity of the falling heated particles HP, otherwise the heated particles HP will be swept upward by the fluid. Thus, in order to maintain the velocity of the cool fluid CF as it travels upward, the cross-sectional area increases as the fluid rises, thus increasing the flow area of the fluid corresponding to its increase of temperature. This maintains the velocity of the fluid as it increases in temperature along its upward path. Near the lower ends 60 of feed tubes 24, the fluid velocity should be minimized, thus the diameter of heat exchange chamber 26 should be at its maximum (maximizing flow area) in this region.

Further, as noted above, the cool fluid CF follows a tangential, upwardly flowing path; i.e., a cyclonic path. This tangential flow eliminates eddy currents within the flow and also helps to reduce exerted drag by translating the air velocity into three components in which the upward velocity component (i.e., that responsible for air drag) becomes a fraction of the inlet air velocity. Further, the swirling flow near the bottom end 64 of the heat exchange chamber 26 enhances fluid-particle mixing, which allows the fluid to capture more thermal energy form the falling particles HP before they leave the heat exchange chamber 26.

Any suitable type of fluid-powered generator may be used to convert the thermal and kinetic energy of the stream of heated fluid into usable electricity. As a non-limiting example, a turbine 38 may be in fluid communication with the fluid outlet 36 of the heat exchange chamber 26 for receiving the stream of heated fluid HF. As shown, a valve 34 may be used to control the flow of heated fluid HF to turbine 38. It should be understood that turbine 38 may be any suitable type of fluid-driven turbine. Alternatively, turbine 38 may be replaced by any suitable type of fluid-driven power converter or generator. Further, as shown in FIGS. 1 and 2, outlet 36 is positioned above the lower ends 60 of the feed tubes 24. This avoids any abrupt changes in the fluid flow near lower ends 60 of the feed tubes 24.

In this non-limiting example, a generator 40 may be coupled to turbine 38 for generating usable electricity. It should be understood that any suitable type of generator may be used. Additionally, as shown in FIG. 1, the heat exchange chamber 26 may further have a particle outlet 52 positioned adjacent lower end 64 for releasing the cooled particles CP. A cooled particle receptacle 54 may be positioned beneath the heat exchange chamber 26, in communication with the particle outlet 52 for temporarily collecting the cooled particles CP.

A second compressor 48 may be used to generate a stream of pressurized fluid, such that at least a portion of the stream of pressurized fluid carries the cooled particles CP from the cooled particle receptacle 54 to the hopper 11, thus recirculating the cooled particles CP. It should be understood that second compressor 48 may be any suitable type of fluid compressor or, alternatively, may be any suitable source of pressurized fluid. As shown in FIG. 1, a valve 30 may be used to control the stream of pressurized fluid generated by second compressor 48. Further, as shown, the stream of pressurized fluid may be split into two different streams of compressed fluid C2, C3 at junction 50. Stream C2 is fed into particle receptacle 54, through an inlet 84, and stream C3 is used to carry the cooled particles CP from an outlet 80, up conduit 82, and back to inlet 14 of particle receiver 12. As shown, a valve 28 may be used to control the flow of stream C3 and cooled particles CP within conduit 82.

Further, a third compressor 44 may be provided for generating an additional stream of compressed fluid C1, which may feed into particle receiver 12 with the heated particles HP feeding into inlet 14. As shown, the stream of compressed fluid C1 may be controlled by a valve 46. The additional streams of pressurized fluid C2 (feeding into particle receptacle 54) and C1 (feeding into particle receiver 12) may be used to maintain fluid pressure throughout the entire system.

It is to be understood that the particle-to-working fluid heat exchanger and the solar power generator using the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A particle-to-working fluid heat exchanger, comprising:
a heat exchange chamber having opposed upper and lower ends, a diameter of the heat exchange chamber decreasing uniformly from the upper end to the lower end, the heat exchange chamber having a fluid inlet positioned adjacent the lower end thereof for receiving a stream of fluid, the stream of fluid being tangentially and upwardly directed within the heat exchange chamber, the heat exchange chamber further having a fluid outlet, positioned adjacent the upper end thereof;
a distribution manifold comprising a receiving cup and a plurality of feed tubes, each of the feed tubes having opposed upper and lower ends, the plurality of feed tubes passing through the upper end of the heat exchange chamber such that the lower ends of the plurality of feed tubes are located within the heat exchange chamber, the upper ends of the plurality of feed tubes being in communication with the receiving cup and extending outside the upper end of the heat exchange chamber, the receiving cup configured to receive a volume of heated particles, each of the plurality of feed tubes configured to distribute a stream of the heated particles into the heat exchange chamber, and wherein each said stream of the heated particles exchanges thermal energy with the stream of fluid to generate a stream of heated fluid and a volume of cooled particles.

2. The particle-to-working fluid heat exchanger as recited in claim 1, further comprising a compressor in fluid communication with the fluid inlet of the heat exchange chamber for producing and delivering the stream of fluid thereto.

3. The particle-to-working fluid heat exchanger as recited in claim 2, further comprising a particle receptacle in communication with a particle outlet of the heat exchange chamber, the particle outlet being positioned adjacent the lower end thereof.

4. The particle-to-working fluid heat exchanger as recited in claim 1, wherein the distribution manifold further comprises a plurality of obstructing elements respectively suspended beneath the lower ends of the plurality of feeds tubes to sprinkle each said stream of heated particles into the heat exchange chamber.

5. The particle-to-working fluid heat exchanger as recited in claim 1, wherein the lower ends of the plurality of feed tubes are positioned beneath the fluid outlet of the heat exchange chamber.

6. A solar power generator, comprising:
a hopper for receiving a stream of cooled particles;
a solar energy receiver in communication with the hopper;
a solar concentrator for concentrating solar radiation on the solar energy receiver to heat the cooled particles received from the hopper;
a heated particle receptacle in communication with the solar energy receiver for receiving heated particles therefrom;
a particle receiver in communication with the heated particle receiver, an inlet thereof being adapted for receiving a stream of the heated particles from the heated particle receptacle;
heat exchange chamber having opposed upper and lower ends, a diameter of the heat exchange chamber decreasing uniformly from the upper end to the lower end, the heat exchange chamber having a fluid inlet positioned adjacent the lower end thereof for receiving a stream of fluid, the stream of fluid being tangentially and upwardly directed within the heat exchange chamber, the heat exchange chamber further having a fluid outlet positioned adjacent the upper end thereof;

a distribution manifold comprising a receiving cup and a plurality of feed tubes, each of the feed tubes having opposed upper and lower ends, the plurality of feed tubes passing through the upper end of the heat exchange chamber such that the lower ends of the plurality of feed tubes are located within the heat exchange chamber, the upper ends of the plurality of feed tubes being in communication with the receiving cup and extending outside the upper end of the heat exchange chamber, the receiving cup configured to receive a volume of the heated particles, each of the plurality of feed tubes configured to distribute a stream of the heated particles into the heat exchange chamber, wherein each said stream of the heated particles exchanges thermal energy with the stream of fluid to generate a stream of heated fluid and the cooled particles; and means for generating electricity from the stream of the heated fluid: and means for recirculating the cooled particles to the hopper.

7. The solar power generator as recited in claim 6, further wherein the means for generating electricity from the stream of heated fluid comprise:
a turbine in fluid communication with the fluid outlet of the heat exchange chamber for receiving the stream of heated fluid; and
a generator coupled to the turbine for generating the electricity.

8. The solar power generator as recited in claim 6, further comprising a first compressor in fluid communication with the fluid inlet of the heat exchange chamber for producing and delivering the stream of fluid thereto.

9. The solar power generator as recited in claim 8, further comprising a cooled particle receptacle in communication with a particle outlet of the heat exchange chamber, the particle outlet being positioned adjacent the lower end thereof.

10. The solar power generator as recited in claim 9, further comprising a second compressor for generating a stream of pressurized fluid, wherein at least a portion of the stream of pressurized fluid carries the cooled particles from the cooled particle receptacle to the inlet of the particle receiver.

11. The solar power generator as recited in claim 6, wherein the distribution manifold further comprises a plurality of obstructing elements respectively suspended beneath the lower ends of the plurality of feed tubes to sprinkle each said stream of heated particles into the heat exchange chamber.

12. The solar power generator as recited in claim 6, wherein the lower ends of the plurality of feed tubes are positioned beneath the fluid outlet of the heat exchange chamber.

* * * * *